US011269453B1

(12) United States Patent
Silverstein et al.

(10) Patent No.: US 11,269,453 B1
(45) Date of Patent: Mar. 8, 2022

(54) FAILED USER-INTERFACE RESOLUTION (71) Applicant: International Business Machines Corporation, Armonk, NY (US)

(72) Inventors: Zachary A. Silverstein, Jacksonville, FL (US); Robert Huntington Grant, Marietta, GA (US); Jacob Thomas Covell, New York, NY (US); Alvin Zhang, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/994,737

(22) Filed: Aug. 17, 2020

(51) Int. Cl.
G06F 3/048 (2013.01)
G06F 3/041 (2006.01)

(52) U.S. Cl.
CPC ............ *G06F 3/0418* (2013.01); *G06F 3/048* (2013.01)

(58) Field of Classification Search
CPC   G06N 3/04; G06N 3/08; G06N 3/084; G06N 20/00; G06N 3/063; G06N 3/0454; G06N 3/082; G06N 5/04; G06N 7/005; G06F 3/048
See application file for complete search history.

(56) References Cited

U.S. PATENT DOCUMENTS 6,971,072 B1 * 11/2005 Stein ...................... G06F 3/011 382/267
7,836,168 B1 * 11/2010 Vasko ................ G05B 19/0421 709/224
8,976,210 B2    3/2015 Heyman
9,098,109 B2    8/2015 Lappalainen
10,019,055 B2   7/2018 Miller
10,185,598 B2   1/2019 Wang
10,237,740 B2 * 3/2019 Ciano ................... G06F 21/629

(Continued)

FOREIGN PATENT DOCUMENTS

CN        102938703 A     2/2013
CN        108829320 A    11/2018

(Continued)

OTHER PUBLICATIONS

"IBM Special offers—Point-of-sale and self-service—United States", printed on Feb. 17, 2020, 2 pages, <https://www.ibm.com/products/specialoffers/us/en/point_of_sale.html>.

*Primary Examiner* — Olga V Merkoulova
(74) *Attorney, Agent, or Firm* — Tyrus Cartwright (57) ABSTRACT Aspects for resolving failed user-interface functionality are described. One or more processors are configured for detecting a first user input having a first input magnitude at user-selectable elements displayed on a local device user-interface, determining that the local device user-interface is not responsive to the first user input; detecting a second user input having a second input magnitude that is greater than the first input magnitude at the user-selectable elements, wherein the first user input and the second user input are by the user; determining that the local device user-interface is not responsive to the second user input; transmitting first data corresponding to a user-interface offload prompt to a mobile device associated with the user, wherein the mobile device is within a predetermined proximity of the local device user-interface; and receiving second data corresponding to a plurality of mobile device user inputs from the mobile device.

20 Claims, 4 Drawing Sheets

(56) References Cited

U.S. PATENT DOCUMENTS

| | | | |
|---|---|---|---|
| 10,416,861 B2 | 9/2019 | Cietwierkowski | |
| 2002/0140626 A1* | 10/2002 | Chang | H04M 1/72412 345/1.1 |
| 2008/0079757 A1* | 4/2008 | Hochmuth | G09G 5/003 345/698 |
| 2008/0226182 A1* | 9/2008 | Ichieda | H04N 1/33392 382/232 |
| 2009/0058884 A1* | 3/2009 | Li | G09G 5/14 345/660 |
| 2009/0128504 A1 | 5/2009 | Smith | |
| 2009/0300419 A1* | 12/2009 | Silverman | G06F 11/2294 714/30 |
| 2010/0023383 A1* | 1/2010 | Aaltonen | G06F 16/9577 455/418 |
| 2010/0073285 A1* | 3/2010 | Bertsch | G09F 19/00 345/156 |
| 2011/0157233 A1* | 6/2011 | Kitagawa | G09G 5/10 345/660 |
| 2012/0075204 A1* | 3/2012 | Murray | G06F 9/452 345/173 |
| 2012/0127207 A1* | 5/2012 | Matas | G06F 3/04886 345/676 |
| 2012/0185420 A1* | 7/2012 | Lappalainen | G06F 3/0346 706/14 |
| 2012/0287163 A1* | 11/2012 | Djavaherian | G09G 5/00 345/667 |
| 2012/0327099 A1* | 12/2012 | Vojak | G06F 3/0304 345/581 |
| 2013/0063455 A1* | 3/2013 | Bayer | H04N 21/4516 345/522 |
| 2016/0034050 A1* | 2/2016 | Ady | G06F 1/3265 345/619 |
| 2016/0246364 A1* | 8/2016 | Miller | G06F 3/012 |
| 2019/0341057 A1* | 11/2019 | Zhang | G10L 25/78 |
| 2021/0004114 A1* | 1/2021 | Park | G06F 1/1684 |
| 2021/0099551 A1* | 4/2021 | Cieslak | H04N 21/4126 |

FOREIGN PATENT DOCUMENTS

| | | |
|---|---|---|
| CN | 111135557 A | 5/2020 |
| EP | 2541384 A2 | 1/2013 |

* cited by examiner

FAILED USER-INTERFACE RESOLUTION

BACKGROUND

The present invention relates generally to the field of resolving user-interface functionality, and more particularly to offloading a failed user-interface functionality to a proximate mobile device.

Fast-food restaurants have evolved from traditionally receiving customer orders over the counter via human interaction to receiving customer orders electronically via Internet-enabled computing devices. As a customer enters a restaurant, that customer may simply approach a self-order kiosk, choose items from a menu, provide payment information, and receive an order confirmation. Placing an order for food or drinks has been simply transferred from interacting with a restaurant employee to a self-service kiosk, replacing human interaction with technology interaction.

Many more mobile device user-interface displays are switching to touch screen displays for the self-serve kiosks as part of the emergence of Internet of Things (IoT) capabilities. IoT refers to the concept of extending internet connectivity beyond conventional computing platforms such as personal computers and mobile devices, and into any range of traditionally non-internet-enabled physical devices and everyday objects. Embedded with electronics, internet connectivity, and other forms of hardware (such as sensors), these devices and objects can communicate and interact with customers over a network connection, and the devices and objects can be remotely monitored and controlled.

SUMMARY

Aspects of the present invention disclose a method, computer program product, and computer system for resolving failed user-interface functionality. One embodiment of the invention may include a local device having one or more processors configured to detect, at one or more user-selectable elements displayed on a local device user-interface, a first user input having a first input magnitude. Further, one or more processors may be configured to determine that the local device user-interface is not responsive to the first user input. The local device one or more processors may also be configured to detect, at the one or more user-selectable elements, a second user input by the user, the second user input having a second input magnitude that is greater than the first input magnitude.

Further, the local device one or more processors may be configured to determine that the local device user-interface is not responsive to the second user input. The one or more processors may be configured to determine non-responsiveness by detecting user aggravation as multiple repeated screen touches, user audible frustration through a microphone, or user cancellation of the interaction by touching a cancel user-selectable element on the local device user-interface. If the local device one or more processors determines the local device user-interface is not responsive, then the local device one or more processors may transmit first data to a mobile device associated with the user, the first data corresponding to a user-interface offload prompt, wherein the mobile device may be within a predetermined proximity of the local device user-interface. Furthermore, the local device one or more processors may be configured to receive second data from the mobile device, the second data may correspond to a plurality of mobile device user inputs received at the mobile device.

In another embodiment, the one or more processors may be configured to determine that the local device user-interface is not responsive to the first user input because the one or more processors failed to execute a command corresponding to the one or more user-selectable elements initiated by the first user input. Further, the mobile device may include one or more processors that may be configured to perform embodiments of the invention described herein. For example, an embodiment of the invention may include one or more processors of a mobile device configured to generate a mobile device user-interface on a display of the mobile device, wherein the mobile device user-interface may include mobile device user-selectable elements corresponding to the one or more user selectable elements.

The user-interface offload prompt may be transmitted to the mobile device in response to determining that the local device user-interface is not responsive to the second user input. At least one of the plurality of mobile device user inputs may correspond to the first user input at the one or more user-selectable elements. The mobile device one or more processors may be configured to transmit the second data to a local device comprising the local device user interface, wherein the local device is connected to a network. The local device may include a wireless communication module configured to facilitate wireless communications between the local device and the mobile device when within the predetermined proximity of the local device.

In another embodiment, the local device one or more processors may be configured for monitoring user interaction. User interaction may be monitored by receiving data from sensors configured to detect user movement, user inputs, or user activity. Further, the one or more sensors may be configured for tracking metrics received from monitoring user interactions. Examples of metrics that may be tracked are sensor data (e.g., pressure, input, audio) or some indication of input cancellation.

In an embodiment, the local device one or more processors may be configured for processing and analyzing the metrics or metric data to determine if the metrics bear any correlation to user aggravation. If the analysis produces results indicating user aggravation, then the local device one or more processors may be configured to offload the local device user interface functionality to a proximate mobile device for display and user interaction on the mobile device user-interface. In other words, the mobile device one or more processors may be configured to mirror the functionality of the local device user-interface on the mobile device user-interface via a wireless data transmission from the local device to the mobile device. However, if the analysis produces results that do not point to user aggravation, the local device one or more processors may be configured to continuously process and analyze the metrics or metric data.

DETAILED DESCRIPTION

Touch screen self-serve kiosks suffer from traditional computer malfunctions. For example, a touch screen user-interface may not register a user input or may fail to execute a software command requested by a user. Customer frustration and aggravation is inevitable when a self-serve kiosk malfunctions when it was designed to ease the customer experience.

IoT devices are sometimes configured to detect user input at a user-interface display to trigger or summon their programmed functionalities. In a customer facing environment (e.g., fast-food restaurant, airport check-in station, retail check-out), these features may be facilitated by a self-serve kiosk, but there appears to be no robust solution for such implementations when the user-interface display malfunctions. The self-serve kiosk may be in network communication with a back-end server system or a knowledge engine to trigger or implement functionalities in network-connected devices (e.g., point-of-sale devices, applications on mobile devices, kitchen display systems, payment processing). Customer initiated transactions may be placed from a user device connected to the network and triggered via specific user inputs, and sometimes when a user is within close enough proximity to this self-serve kiosk. However, the self-serve kiosk user-interface may fail to receive user inputs resulting in user aggravation and frustration when the purpose of the self-serve system is designed to reduce wait-times and inconvenience. In other words, a customer order may not be received when the self-serve kiosk user-interface fails to execute commands associated with the user inputs.

Aspects of the invention described herein facilitate and enable a self-service kiosk user-interface to detect user inputs, determine that the user-interface is not responding as intended, and offload the user-interface to a nearby user mobile device to allow the user to continue placing their order via the user mobile device. Certain aspects of this invention's embodiments facilitate the resolution of a failed touch screen by offloading the user-interface to a user mobile device.

Example embodiments described herein provide for methods, systems, and computer program products for resolving failed user-interface functionality. One embodiment of the invention may include a local device having one or more processors configured to detect, at one or more user-selectable elements displayed on a local device user-interface, a first user input having a first input magnitude. Further, the local device one or more processors may be configured to determine that the local device user-interface is not responsive to the first user input. The local device one or more processors may be configured to detect, at the one or more user-selectable elements, a second user input by the user, the second user input having a second input magnitude that is greater than the first input magnitude.

Further, local device one or more processors may be configured to determine that the local device user-interface is not responsive to the second user input. The one or more processors may determine non-responsiveness by detecting user aggravation as multiple repeated screen touches, user audible frustration through a microphone, or user cancellation of the interaction by touching a cancel user-selectable element on the local device user-interface. If the local device determines the local device user-interface is not responsive, then the local device may be configured to then transmit first data to a mobile device associated with the user, the first data corresponding to a user-interface offload prompt. The local device may be configured to determine that the mobile device is within a predetermined proximity of the local device user-interface before transmitting data to the mobile device. Furthermore, local device one or more processors may be configured to receive second data from the mobile device, where the second data may correspond to a plurality of mobile device user inputs received at a user-interface on the mobile device.

In another embodiment, the local device one or more processors may be configured to determine that the local device user-interface is not responsive to the first user input because the local device one or more processors failed to execute a command corresponding to the one or more user-selectable elements initiated by the first user input. Further, the mobile device one or more processors may be configured to generate a mobile device user-interface on a display of the mobile device, wherein the mobile device user-interface may include mobile device user-selectable elements corresponding to the one or more user selectable elements.

The user-interface offload prompt may be transmitted from the local device to the mobile device in response to determining that the local device user-interface is not responsive to the second user input. For example, once the user-interface offload prompt is received at the mobile device, the mobile device may be configured to generate a notification to the mobile device user indicating local device non-responsiveness. In addition to the notification, the mobile device may be configured to generate a prompt to the user, which when selected, generates a user-interface on the mobile device display. The mobile device user-interface may be configured to receive a plurality of mobile device user inputs at the mobile device. At least one of the plurality of mobile device user inputs may correspond to the first user input at the one or more user-selectable elements. In other words, a mobile device user input may be the same as the first user input attempted by the user at the local device user-interface, but rather provided at the mobile device user-interface since the local device user-interface was not responsive.

The mobile device one or more processors may be configured to transmit the plurality of mobile device user inputs as second data to the local device comprising the local device user interface. The local device may be connected to a network within the facility in which the local device is installed. The local device may include a wireless communication module configured to facilitate wireless communications between the local device and the mobile device when within the predetermined proximity of the local device.

In another embodiment, the local device may be configured for monitoring user interaction by receiving data from sensors configured to detect user movement, user inputs, or user activity. Further, the one or more sensors may be configured for tracking metrics received from monitoring user interactions. Examples of metrics that may be tracked are sensor data (e.g., pressure, input, audio) or some indication of input cancellation.

In an embodiment, local device one or more processors may be configured for processing and analyzing the metrics or metric data to determine if the metrics bear any correlation to user aggravation. If the analysis produces results indicating user aggravation, then the one or more processors may be configured to offload the local device user interface functionality to a proximate mobile device for display and user interaction on the mobile device user-interface. In other words, the one or more processors may be configured to mirror the functionality of the local device user-interface on a mobile device user-interface via a wireless data transmission from the local device to the mobile device. However, if the analysis produces results that do not point to user aggravation, the one or more processors may be configured to continuously process and analyze the metrics or metric data.

The present invention will now be described in detail with reference to the Figures.

Figure 1:
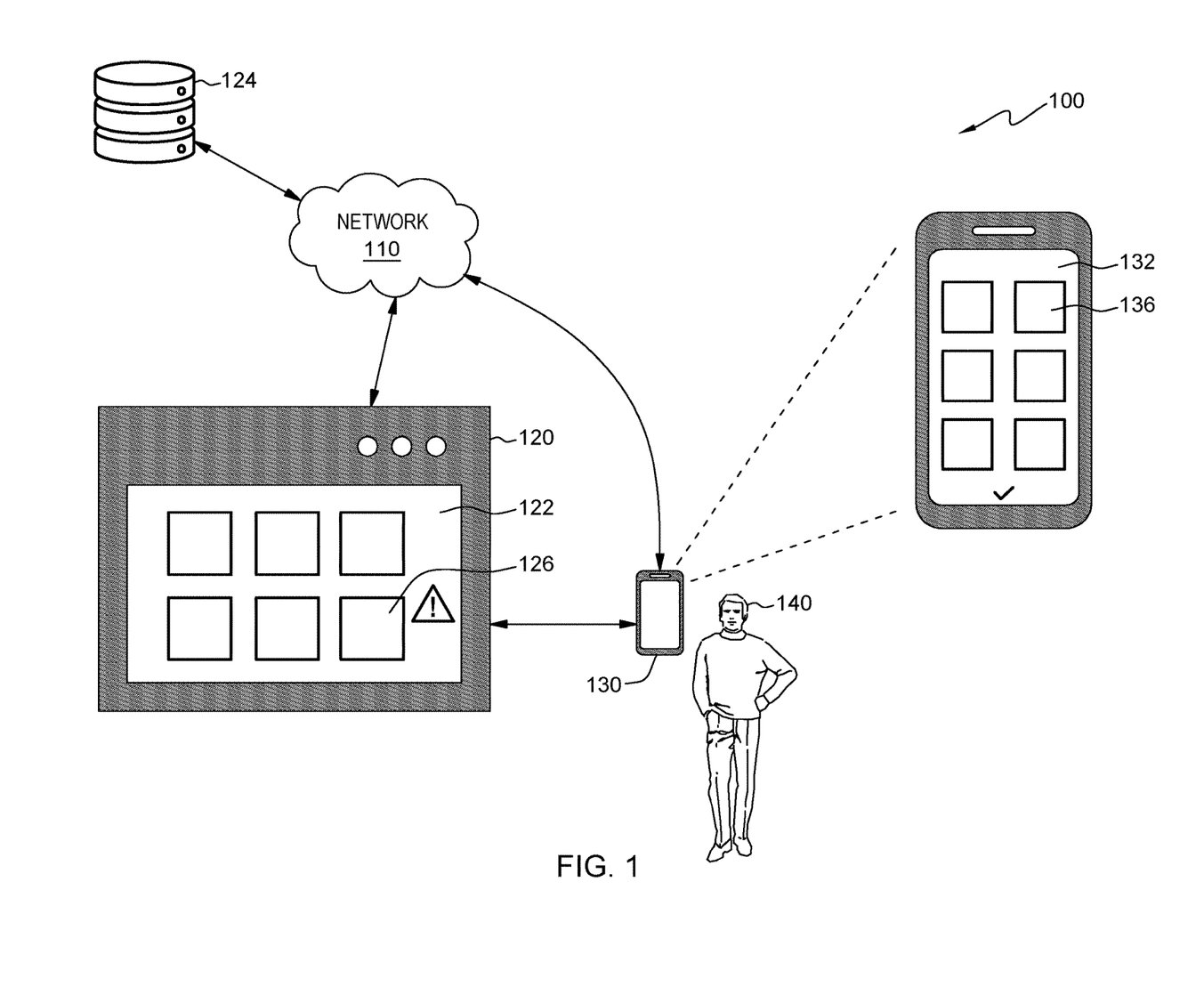
FIG. 1 depicts a block diagram of a distributed data processing environment, in accordance with an embodiment of the present invention.

FIG. 1 depicts a block diagram of a distributed data processing environment 100 for resolving failed user-interface functionality, in accordance with an embodiment of the present invention. FIG. 1 provides only an illustration of one embodiment of the present invention and does not imply any limitations with regard to the environments in which different embodiments may be implemented.

In the depicted embodiment, distributed data processing environment 100 includes local device 120, database 124, and mobile device 130 interconnected over network 110. Network 110 can be, for example, a local area network (LAN), a wide area network (WAN) such as the Internet, or a combination of the two, and can include wired, wireless, or fiber optic connections. Network 110 can include one or more wired and/or wireless networks that are capable of receiving and transmitting data, voice, and/or video signals, including multimedia signals that include voice, data, and video information. In general, network 110 can be any combination of connections and protocols that will support communications between local device 120, database 124, and mobile device 130. In an embodiment, network 110 may be a private/secure network that may include a firewall to block unauthorized access to or from network 110 while permitting outward communication. Distributed data processing environment 100 may include additional servers, computers, or other devices not shown.

Network 110 may be in communication with local device 120 having a user-interface 122 displaying one or more user-selectable elements 126 thereon. In one embodiment, local device 120 may be configured to receive user inputs by a user 140 at local device user-interface 122. User inputs may include detecting a touch action at a user-selectable element 126 that is displayed on local device user-interface 122. User inputs may have varying magnitudes that may be determined by measuring pressure as applied to the screen as the touch screen is pressed or touched. Thus, a first user input may have a first input magnitude and a second user input may have a second input magnitude that is less than, greater than or equal to the first input magnitude.

Upon detecting a user input at the one or more user-selectable elements, local device one or more processors may determine that the local device user-interface 122 is not responsive to the user input. After the first input or after following user inputs, if the local device 120 determines that the local device user-interface 122 is not responsive, local device 120 one or more processors may then determine if the mobile device 130 is within a predetermined proximity to local device 120 to be within range for successfully transmitting the data to mobile device 130.

Once local device 120 one or more processors determines that mobile device 130 is within the predetermined proximity to local device 120, local device 120 one or more processors may be configured to transmit data corresponding to a user-interface offload prompt to mobile device 130 associated with user 140. The data may be transmitted using a wireless communication medium from local device 120 to mobile device 130.

In an embodiment, mobile device 130 may be configured to receive data corresponding to the user-interface offload prompt. Upon receiving data, mobile device 130 one or more processors may be configured to generate mobile device user selectable elements 136 displayed on mobile device user-interface 132. Mobile device 130 may be configured to generate mobile device user-interface 132 to resemble local device user-interface 122. Optionally, mobile device user-interface 132 may mirror local device user-interface 122. However, as long as mobile device user-interface 132 displays the same or similarly depicted user-interfaces as shown on local device user-interface 122, mobile device user-interface 132 will be sufficiently accurate for user 140 to continue interacting with local device 120, even though local device user-interface 122 is not responsive to the user inputs.

Mobile device 130 may be configured to detect user inputs at mobile device user selectable elements 136 as displayed on mobile device user interface 132. Mobile device 130 one or more processors may be configured to process commands associated with user selectable elements 136. Further, mobile device 130 may include memory (not shown) to store data corresponding to the mobile device 130 user inputs and associated commands. The one or more processors may be configured to transmit the data corresponding mobile device 130 user inputs and associated commands to local device 120 via the wireless communication channel as described above.

In an embodiment, local device 120 may be configured to receive the data corresponding to the plurality of user inputs and associated commands from mobile device 130. Upon receiving data from mobile device 130, local device 120 may be configured to process the data and execute the commands as intended. For example, if the data from mobile device 130 corresponds to a selection of items as shown on a menu represented by the mobile device user selectable elements 136, local device 120 one or more processors may be configured to execute commands associated with such item selections, process payment information included in the data, and provide a confirmation to user 140 that the order was successfully received.

Local device 120 operates as a computing device with a local user interface 122 for interfacing with a plurality of users. In an embodiment, local device 120 operates as a self-serve kiosk for customers of a business (e.g., fast-food restaurant, airport check-in station, and/or retail check-out). In some embodiments, local device 120 may each be a management server, a web server, or any other electronic device or computing system capable of receiving and sending data. In some embodiments, local device 120 may be a laptop computer, tablet computer, netbook computer, personal computer (PC), a desktop computer, a smart phone, or any programmable electronic device capable of communicating with other IoT devices via network 110. Local device 120 may include components as described in further detail in FIG. 4.

Mobile device 130 may operate to execute and display a user interface 132 for interacting with an owner and/or authorized user 140 of mobile device 130. In an example embodiment, mobile device 130 may be configured to send and/or receive data from network 110 and/or local device 120. In some embodiments, mobile device 130 may each be a laptop computer, tablet computer, netbook computer, personal computer (PC), a desktop computer, a smart phone, smart device, or any programmable electronic device capable of communicating with other computing devices via network 110. Mobile device 130 may include components as described in further detail in FIG. 4.

User interface 132 operates as a mobile user interface on mobile device 130 through which one or more users of mobile device 130 interact with mobile device 130. In some embodiments, user interface 132 is a graphical user interface (GUI), a web user interface (WUI), and/or a voice user interface (VUI) that can display (i.e., visually), present (i.e., audibly), and/or enable a user 140 to enter or receive information (i.e., graphics, text, and/or sound) for or from the one or more processors on mobile device 130 via network 105. In an embodiment, user interface 132 enables a user 140 to send and receive data (i.e., to and from one or more processors via network 110, respectively).

In an embodiment, user interface 132 display, present, or enable a user 140 to set-up a workflow of mobile device 130. In an embodiment, user interface 132 display, present, or enable a user 140 to approve of a workflow created based on historical usage patterns of mobile device 130. In an embodiment, user interface 132 display, present, or enable a user 140 to receive notifications from mobile device one or more processors, e.g., displaying user-selectable elements of menu items. In an embodiment, user interface 132 enable a user 140 to enter information requested by the mobile device one or more processors, e.g., receiving user inputs corresponding to selection of items from a list.

Data may be stored in a database 124 that is in communication with the network 110. Database 124 may operate as a repository for mobile device data, local device data, and other data (e.g., device type profiles, device profiles) that may be associated with mobile device data or local device data. A database is an organized collection of data. Database 124 can be implemented with any type of storage device capable of storing data and configuration files that can be accessed and utilized by either of local device 120 or mobile device 130, such as a database server, a hard disk drive, or a flash memory. In an embodiment, database 124 may be accessed by local device 120 to store local device data, mobile device data, device type profiles, device profiles. In another embodiment, database 124 may be accessed by mobile device 130 to access mobile device data, device type profiles, device profiles. In the depicted embodiment, database 124 may reside independent of the network. In another embodiment, database 124 may reside elsewhere within distributed data processing environment 100 provided database 124 has access to network 110.

In another example embodiment, a user 140 may be permitted to agree to a terms and service agreement upon setting up computing devices with network 110. The user agreement may document the purpose of the information and data sharing between local device 120 and mobile device 130 and provide access to the devices on network 110 that have been designated for participation in network 110. The user agreement may include all mentioned passing devices that would allow control(s), trigger(s), or action(s) to be executed based on the user's original request. For networks with multiple users and multiple computing devices, the system may extend the usage agreement to a defined or dynamic group, upon a new user 140 joining said group.

Figure 2:
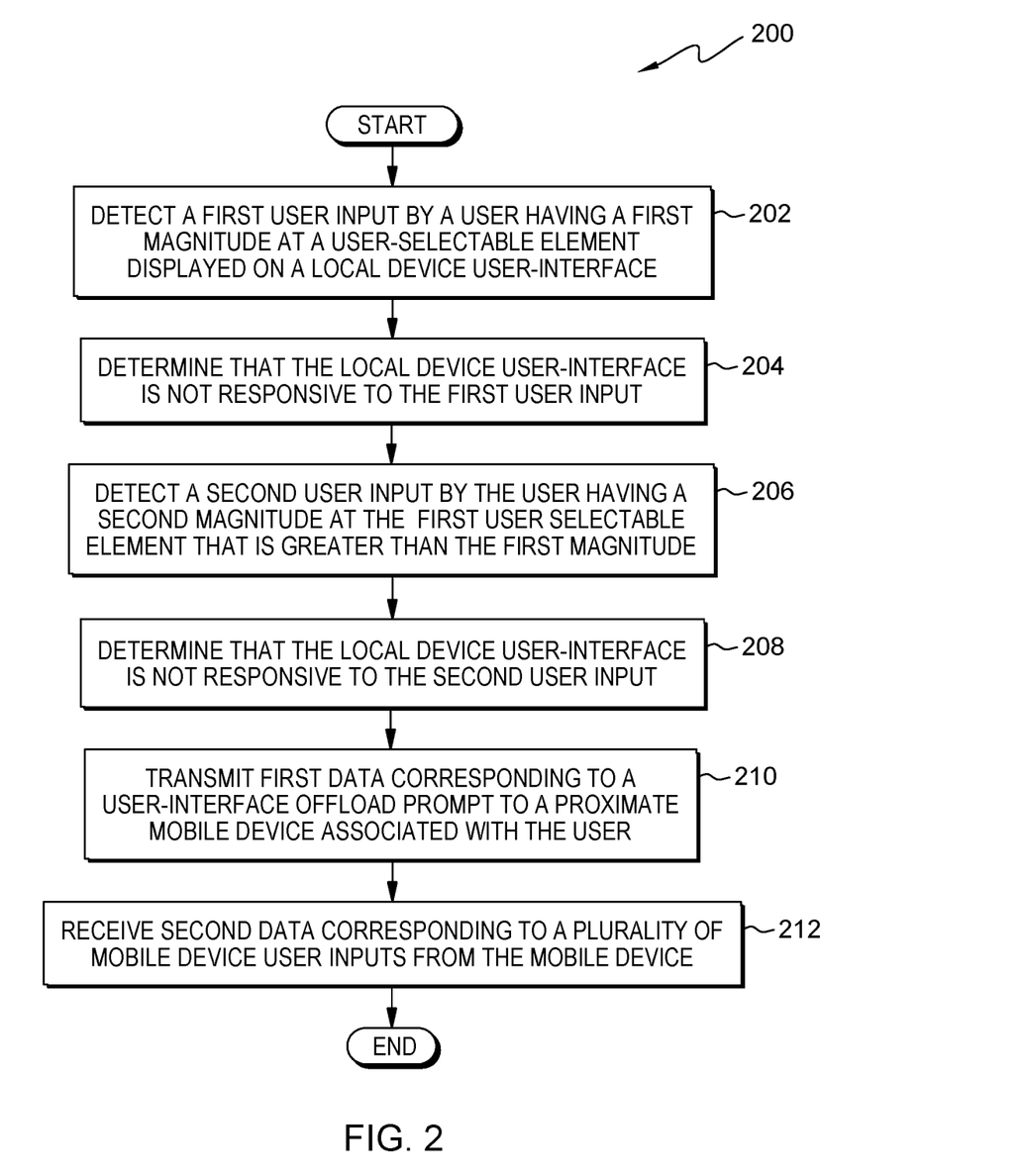
FIG. 2 depicts a flowchart of a method for resolving failed user-interface functionality, in accordance with an embodiment of the present invention.

Referring now to FIG. 2, FIG. 2 depicts a flowchart of a method 200 for resolving failed user-interface functionality, in accordance with an embodiment of the present invention. The method 200 may include a local device 120 having one or more processors configured for detecting 202 a first user input, by a user, at one or more user-selectable elements displayed on a local device user-interface 122, the first user input having a first magnitude.

Further, the method 200 may include the one or more processors configured for determining 204 that the local device user-interface 122 is not responsive to the first user input. In an embodiment, the one or more processors may be configured to determine that the local device user-interface 122 is not responsive to the first user input in various ways. In an embodiment, the one or more processors may further be configured to determine that the one or more processors failed to execute a command corresponding to the one or more user-selectable elements 126 displayed on the local device user-interface 122. For example, if the first user input with an input magnitude of 1 pound per square inch (psi) corresponds to the user touching a user-selectable icon with the word "start" displayed, then the corresponding command for that user input may be an executable function that is supposed to start or execute when selected. The input magnitude of 1 psi may be sufficient for the touch screen to register a selection on the user interface 122. However, the corresponding command may fail to execute because the local device user-interface 122 did not properly register the user input as an input to initiate the corresponding command. There may be a technical issue with the touch-screen functionality of the local device user-interface 122.

Further, if the second user input with an input magnitude of 2 psi corresponds to the user 140 touching the same user-selectable icon with the word "start" displayed, then the corresponding command may again fail to execute for various reasons, including the example described above. Regardless of the reason for the failure, the local device 120 may be configured to determine, that after the second user input with an input magnitude greater than the input magnitude of the first user input, the local device user-interface 122 is not responsive to the second user input.

The method 200 may include other ways for the one or more processors to determine that the local device user-interface 122 is not responsive to a user input. For example, the one or more processors may be configured to determine non-responsiveness indicated by user frustration by analyzing user images, user body language, or user facial expressions. In an embodiment, one or more image sensors (e.g., camera, infrared sensor) communicatively coupled to the local device 120 may be configured to capture an image of a user face and perform an analysis on the user facial features to detect an expression indicative of a user emotion. For example, if a user facial expression is a frown, then the one or more processors may be configured to determine that the user 140 is sad or upset.

In another example, if the user facial expression includes the inner eyebrows bent upward, eyes slightly closed, or the mouth corners pulled downward, then the one or more processors may be configured to determine that the user 140 is sad. Further, in another example, if the user facial expression includes the inner eyebrows pulled downward and together, eyes wide open, lips pressed against each other or opened to expose teeth, then the one or more processors may be configured to determine that the user 140 is angry. Other combinations of facial expressions may be determined to indicate anger, sadness, or frustrations. Thus, if the one or more processors determine that the user 140 is frustrated based on user facial expressions indicating the user 140 is sad or angry, in addition to detecting one or more user inputs at the local device user-interface 122, the one or more processors may determine that the local device user-interface is not responsive.

In another embodiment, one or more image sensors (e.g., camera, infrared sensor) communicatively coupled to the local device 120 may be configured to capture one or more images of user body language. For example, if the one or more processors analyze images of the user body and determine that the user hand is in a balled fist, then the one or more processors may be configured to determine that the user body language indicates frustration. Other types of body languages may be determined based on the images as known by a person of ordinary skill in the art.

Further, the method 200 may include the local device one or more processors configured for detecting 206 a second user input, by the user, at the one or more user-selectable elements 126, the second user input having a second magnitude that may be greater than, less than, or equal to the first input magnitude.

Furthermore, the method 200 may include one or more processors configured for determining 208 that the local device user-interface 122 is not responsive to the second user input, similarly to embodiments described above herein.

The local device 120 may determine that the local device user-interface 122 is not responsive to user inputs in various ways. In an embodiment, the local device 120 may detect a threshold number of failed user inputs and determine that the threshold number exceeds the number of attempts that may be necessary to execute a command. For example, if the local device user-interface 122 detects two or more user inputs at the same local device user-selectable element 126, then the local device 120 may determine that the local device user-interface 122 is not responsive.

In another embodiment, if the local device user-interface 122 detects two or more user inputs at any of the one or more local device user-selectable elements 126, where the input magnitude for each successive user input increases by a predetermined threshold amount, then the local device 120 may determine that the local device user-interface 122 is not responsive. For example, if a second input magnitude is greater than a first input magnitude by a predetermined threshold of 25% of the first input magnitude, and the one or more processors fail to execute the corresponding command, then the one or more processors may determine that the local device user-interface 122 is not responsive to the local device user inputs. Other predetermined threshold amounts may be used to determine non-responsiveness. The local device user-interface 122 may include pressure sensors configured to measure the pressure of each user input detected on the display. If the pressure sensors detect increasing pressure amounts or a pressure change that exceeds a predetermined threshold, then the local device 120 may determine that the local device user-interface 122 is not responsive.

Alternatively, in another embodiment, the local device 120 may include audio sensors configured to detect a user voice, in which one or more processors may be configured to process the user voice to convert into user audio data. The user audio data may be processed by a Natural Language Unit (NLU) engine and/or an Automatic Speech Recognition (ASR) engine to determine user intent. In this embodiment, the NLU and/or ASR may be configured to determine that the user audio data indicates user frustration or user aggravation corresponding to difficulty interacting with the local device user-interface 122. Thus, if the one or more processors determine that the user 140 is frustrated or aggravated, then the local device 120 may determine that the local device user-interface is not responsive.

In yet another embodiment, the local device user-interface may include a local device user-selectable element 126 corresponding to a command to cancel the interaction with the local device user-interface. The cancel interaction user-selectable element may be configured such that the user 140 may cancel the interaction even if the local device user-interface is not responsive to the user inputs.

The one or more processors may be at any location within the distributed data processing environment 100, such that data collected at any device connected to the network 110 may be routed to any of the one or more processors for processing, storage or re-routing. For example, data collected at the local device 120 may be transmitted to the network 110 and saved in the database 124 for processing by some other processing resource available to the distributed data processing environment 100. Similarly, data collected at the mobile device 130 may be transmitted to the network 110 and saved in the database 124 for processing by some other processing resource available to the distributed data processing environment 100. Thus, the one or more processors are not limited to any particular device connected to the network 110. However, some embodiments may describe processing processes occurring at a device that is best suited for executing the processes due to convenience factors.

Even further, the method 200 may include the one or more processors configured for transmitting 210 local device data to a mobile device associated with the user. The local device data may be collected or generated at the local device and made available to other network-connected devices via network 110. Local device data may also be described herein as data generated by the local device, or first data. Local device data may include data corresponding to a user-interface offload prompt that may include a notification to be presented to a user 140 that the local device is not responsive and to provide a user option to offload the local device user-interface to the mobile device associated with the user. In an embodiment, the local device may be configured for determining if the mobile device is within a predetermined proximity to the local device.

The local device data may configured to generate a notification on the mobile device when the mobile device receives and processes the local device data. For example, when the mobile device receives the local device data or the data from the local device, the mobile device one or more processors may be configured to produce a notification on the mobile device to alert the user. The notification may be an audible notification, a visible notification, a vibrating notification, or some combination of each to indicate that the local device user-interface is not responsive to the user inputs. For example, after the local device determines that the local device user-interface is not responsive to the user inputs, the local device may transmit local device data including a notification to the mobile device, and that when the mobile device processes the local device data, an audible, vibrating, or visible notification may be generated with a message indicating local device user-interface failure.

The mobile device user-interface may be generated on the mobile device display as a local software application executing the method 200 on the mobile device. The local device data may include a uniform resource locator (URL) or web address configured to generate a version of the local device user-interface on the mobile device user-interface. Alternatively, a quick response (QR) code may be displayed on the local device user-interface for capture by a camera of the mobile device, wherein the QR code may provide access to the local device data on the mobile device.

The notification may also include a prompt visible to the user 140 to select a user-selectable element to offload the local device user-interface to the mobile device user-interface. In response to selecting the user-selectable element to offload the local device user-interface, the mobile device may be configured to execute a command that generates a mobile device user-interface resembling the local device user-interface. Alternatively, the mobile device may be configured to execute a command that generates a mobile device user-interface that does not resemble the local device user-interface, but rather generates a mobile device user-interface that includes mobile device user-selectable elements 136 that match the functionalities of the local device user-selectable element 126. For example, the local device user-selectable elements 126 may be positioned in a certain arrangement that is suitable to the display properties (e.g., display size, resolution) of the local device user-interface display, whereas the mobile device user-selectable elements 136 may be positioned in an arrangement that is different from the local device user-interface that is suitable to the display properties (e.g., display size, resolution) of the mobile device user-interface 132.

Even further, the method 200 may include the local device receiving 212 mobile device data from the mobile device 130. The mobile device data may correspond to a plurality of mobile device user inputs entered by the user 140 at the mobile device user-interface 132. The mobile device user-interface 132 may resemble the local device user-interface 122 such that the user 140 may interact with the mobile device 130 in the same way as the user 140 would interact with the local device 120. Mobile device data may also be described herein as data generated by the mobile device 120, or second data. Mobile device data may include data gathered or generated at the mobile device 120.

Figure 3:
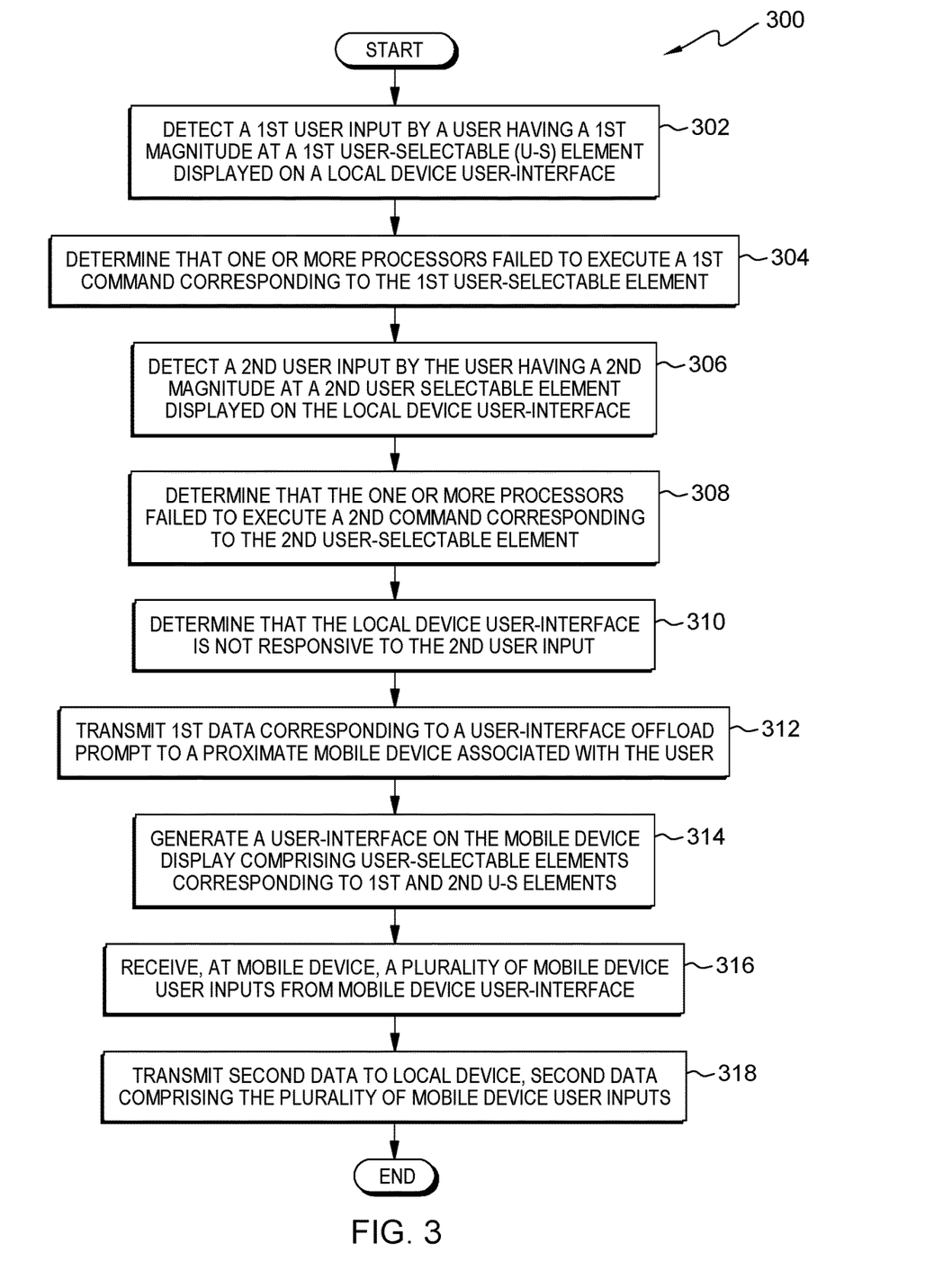
FIG. 3 depicts a flowchart of another method for resolving failed user-interface functionality, in accordance with an embodiment of the present invention.

Now referring to FIG. 3, which depicts a flowchart of method 300 for resolving failed user-interface functionality, in accordance with another embodiment of the present invention. The method 300 may include one or more processors at the local device 120 configured for detecting 302 a first user input having a first input magnitude, by a user, at a local device user-selectable element 126 displayed on a local device user-interface 122. The method 300 may further include one or more processors configured for determining 304 that the one or more processors failed to execute a first command corresponding to the first local device user-selectable element 126.

Further, the one or more processors may be configured for detecting 306 a second user input having a second input magnitude, by the user, at a second local device user-selectable element 126 displayed on the local device user-interface 122, determining 308 that the one or more processors failed to execute a second command corresponding to the second local device user-selectable element 126, determining 310 that the local device user-interface 122 is not responsive to the first user input and the second user input.

In response to determining 310 that the local device user-interface 122 is not responsive to the second user input, the one or more processors may be further configured for transmitting 312 first data (e.g., local device data) to a proximate mobile device associated with the user. The first data may be corresponding to or including data corresponding to a user-interface offload prompt as described above herein.

In another embodiment, the one or more processors may be further configured for generating 314 a mobile device user-interface 132 on a display of the mobile device 130. The mobile device user-interface 132 may include user-selectable elements 136 corresponding to the first local device user-selectable element 126 and the second local device user-selectable element 126 described above as displayed on the local device user-interface 122. In other words, the mobile device user interface 132 may be configured to resemble or mirror the local device user-interface 122. The mobile device user-interface 132 may be generated using at least the first data received from the local device 120. For example, the mobile device user-interface 132 may be generated within an internet browser application installed on the mobile device. Alternatively, the mobile device user-interface 132 may be generated in an application published by the owner or agent of the local device 120, whereas the application will be compatible with the software executing on the local device 120. In other words, a software application designed specifically to execute and display a version of the local device user-interface 122 on the mobile device user-interface 132 may be provided to the mobile device 130 user for the user 140 to download. Thus, when the local device data is transmitted from the local device 120 to the mobile device 130, the mobile device 130 may be configured to execute the software application on the mobile device 130 using the local device data.

In yet another embodiment, the method 300 may include the mobile device one or more processors receiving 316 data corresponding to a plurality of mobile device user inputs from the mobile device user-interface 132. The plurality of mobile device user inputs may include touch actions detected on a touch screen display of the mobile device 130, wherein the touch actions correspond to the user 140 touching or selecting one or more mobile device user-selectable elements 136 displayed on the touch screen. For example, a first user input may be a user 140 selecting a mobile device user-selectable element 136 labeled "start order", which may be configured to display a list of menu options corresponding to menu option user-selectable elements. A second user input may be the user 140 selecting one or more of the menu option user-selectable elements, and so on. A third user input may be the user 140 providing payment information to complete the order. Nonetheless, each user input may be captured and stored in the mobile device memory as the plurality of mobile device user inputs for transmission to the network 110, either via the local device 120 or directly to the network via another connection to the network 110.

Furthermore, the method 300 may include mobile device one or more processors configured for transmitting 318 second data, including the plurality of mobile device user inputs, to the local device 120. The second data may be transmitted directly to the network 110 via a wireless communication medium or some other form of network connection. Nonetheless, the data corresponding to the user inputs at the mobile device 130 will have been captured on the mobile device user-interface 132 to resolve the failed local device user-interface functionality.

In an embodiment, local device 120 may be configured to be registered to the network 110 in order to facilitate communications between the local device 120 and another network-connected device. For example, local device 120 may include data corresponding to a software application configured to execute on the local device 120. When executed on the local device 120, the software application may facilitate registration to a server associated with the business in which the local device 120 is used. Registration may occur via network 110 in which the local device 120 and the server are connected. Similar to how local device 120 may be registered to the network 110, mobile device 130 may also be registered to the network 110 to facilitate communications with other network-connected devices not shown in the figures.

In an embodiment, the user inputs received at the local device 120 and the mobile device 130 may be agnostic, meaning the user inputs may not be limited to touch actions as described herein. Rather, the user inputs may be voice command inputs, other peripheral type inputs or a computer-generated input as directed by the user.

Figure 4:
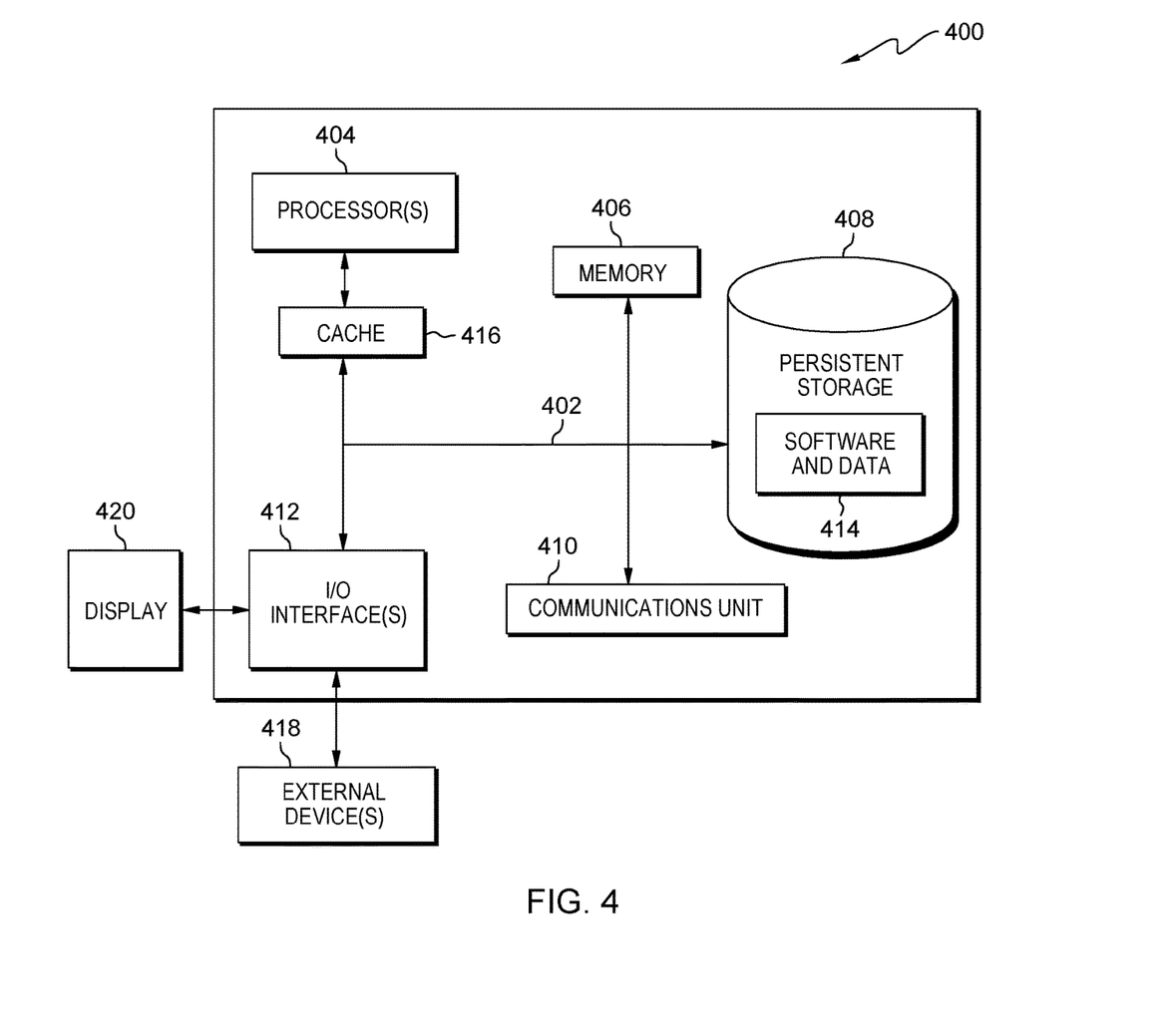
FIG. 4 depicts a block diagram of a computing device of IoT computing environment, in accordance with an embodiment of the present invention.

FIG. 4 depicts a block diagram of computer 400 suitable for resolving failed user-interface functionality, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 (e.g., mobile device 130) includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Software and data 414 may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 414 may be downloaded to persistent storage 408 through communications unit 410.

I/O interface(s) 412 allows for input and output of data with other devices that may be connected to computer 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data 414 used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user 140 and may be, for example, a computer monitor.

IoT data may include any data used by an IoT device, stored on an IoT device, and sent or received by an IoT device, which can include sensitive IoT data. Sensitive IoT data includes, but is not limited to, biometric data, credit card numbers, personal identification numbers, medical records, passwords, access codes, etc.

The present invention may contain various accessible data sources, such as database 124, that may include personal data, content, or information the user 140 wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Software and data 414 may enable the authorized and secure processing of personal data. Software and data 414 may be configured to provide informed consent, with notice of the collection of personal data, allowing the user 140 to opt in or opt out of processing personal data. Consent can take several forms. Opt-in consent can impose on the user 140 to take an affirmative action before personal data is processed. Alternatively, opt-out consent can impose on the user 140 to take an affirmative action to prevent the processing of personal data before personal data is processed. Software and data 414 may provide information regarding personal data and the nature (e.g., type, scope, purpose, duration, etc.) of the processing. Software and data 414 provide the user 140 with copies of stored personal data. Software and data 414 allow the correction or completion of incorrect or incomplete personal data. Software and data 414 allow the immediate deletion of personal data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for resolving failed user-interface functionality, the method comprising:
   detecting, by one or more processors, at one or more user-selectable elements displayed on a local device user-interface of a local device, a first user input having a first input magnitude, the first user input by a user;
   determining, by the one or more processors, that the local device user-interface is not responsive to the first user input;
   detecting, at the one or more user-selectable elements, a second user input having a second input magnitude that is greater than the first input magnitude, the second user input by the user;

determining, by the one or more processors, that the local device user-interface is not responsive to the second user input;

transmitting, by the one or more processors, first data corresponding to a user-interface offload prompt to a mobile device associated with the user, the mobile device within a predetermined proximity of the local device user-interface; and receiving, by the one or more processors, second data corresponding to a plurality of mobile device user inputs from the mobile device.

2. The method of claim 1, wherein determining that the local device user-interface is not responsive to the first user input further comprises:

determining, by the one or more processors, that the local device failed to execute a command corresponding to the one or more user-selectable elements.

3. The method of claim 1, further comprising:

generating, by the one or more processors, a mobile device user-interface on a display of the mobile device, the mobile device user-interface comprising mobile device user-selectable elements corresponding to the one or more user selectable elements.

4. The method of claim 1, wherein the user-interface offload prompt is transmitted to the mobile device in response to determining that the local device user-interface is not responsive to the second user input.

5. The method of claim 1, wherein at least one of the plurality of mobile device user inputs correspond to the first user input at the one or more user-selectable elements.

6. The method of claim 1, wherein determining that the local device user-interface is not responsive to the second user input further comprises receiving metric data from one or more sensors, the metric data corresponding to user aggravation.

7. The method of claim 1, wherein determining that the local device the user-interface is not responsive to the second user input further comprises determining that the second input magnitude is greater than the first input magnitude by a predetermined threshold.

8. A computer program product for resolving failed user-interface functionality, the computer program product comprising:

one or more computer readable storage media and program instructions stored on the one or more computer readable storage media, the program instructions comprising:

program instructions to detect, at one or more user-selectable elements displayed on a local device user-interface, a first user input having a first input magnitude, the first user input by a user;

program instructions to determine, by one or more processors, that the local device user-interface is not responsive to the first user input;

program instructions to detect, at the one or more user-selectable elements, a second user input having a second input magnitude that is greater than the first input magnitude, the second user input by the user;

program instructions to determine, by the one or more processors, that the local device user-interface is not responsive to the second user input;

program instructions to transmit, by the one or more processors, first data corresponding to a user-interface offload prompt to a mobile device associated with the user, the mobile device within a predetermined proximity of the local device user-interface; and program instructions to receive, by the one or more processors, second data corresponding to a plurality of mobile device user inputs from the mobile device.

9. The computer program product of claim 8, wherein determining that the local device user-interface is not responsive to the first user input further comprises:

determining, by the one or more processors, that the one or more processors failed to execute a command corresponding to the one or more user-selectable elements.

10. The computer program product of claim 8, further comprising generating, by the one or more processors, a mobile device user-interface on a display of the mobile device, the mobile device user-interface comprising mobile device user-selectable elements corresponding to the one or more user selectable elements.

11. The computer program product of claim 8, wherein the user-interface offload prompt is transmitted to the mobile device in response to determining that the local device user-interface is not responsive to the second user input.

12. The computer program product of claim 8, wherein at least one of the pluralities of mobile device user inputs correspond to the first user input at the one or more user-selectable elements.

13. The computer program product of claim 8, wherein determining that the local device user-interface is not responsive to the second user input further comprises receiving metric data from one or more sensors, the metric data corresponding to user aggravation.

14. The computer program product of claim 8, wherein determining that the local device user-interface is not responsive to the second user input further comprises determining that the second input magnitude is greater than the first input magnitude by a predetermined threshold.

15. A computer system for processing commands in a network, the computer system comprising:

one or more computer processors;

one or more computer readable storage media;

program instructions stored on the one or more computer readable storage media for execution by at least one of the one or more processors, the program instructions comprising:

program instructions to detect, at one or more user-selectable elements displayed on a local device user-interface, a first user input by a user, having a first input magnitude;

program instructions to determine, by one or more processors, that the local device user-interface is not responsive to the first user input;

program instructions to detect, at the one or more user-selectable elements, a second user input by the user, the second user input having a second input magnitude that is greater than the first input magnitude;

program instructions to determine, by the one or more processors, that the local device user-interface is not responsive to the second user input;

program instructions to transmit, by the one or more processors, first data corresponding to a user-interface offload prompt to a mobile device associated with the user, the mobile device within a predetermined proximity of the local device user-interface; and program instructions to receive, by the one or more processors, second data corresponding to a plurality of mobile device user inputs from the mobile device.

16. The computer system of claim 15, wherein determining that the local device user-interface is not responsive to the first user input further comprises:
    determining, by the one or more processors, that the one or more processors failed to execute a command corresponding to the one or more user-selectable elements.

17. The computer system of claim 15, further comprising generating, by the one or more processors, a mobile device user-interface on a display of the mobile device, the mobile device user-interface comprising mobile device user-selectable elements corresponding to the one or more user selectable elements.

18. The computer system of claim 15, wherein the user-interface offload prompt is transmitted to the mobile device in response to determining that the local device user-interface is not responsive to the second user input.

19. The computer system of claim 15, further comprising program instructions to transmit the second data to a local device comprising the local device user interface, wherein the local device is connected to a network.

20. The computer system of claim 15, wherein determining that the local device user-interface is not responsive to the second user input further comprises receiving metric data from one or more sensors, the metric data corresponding to user aggravation.

\* \* \* \* \*